(12) United States Patent
Vitomir

(10) Patent No.: US 11,401,402 B2
(45) Date of Patent: Aug. 2, 2022

(54) COMPOSITIONS AND METHODS FOR REMOVAL OF PRESSURE SENSITIVE ADHESIVES

(71) Applicant: Protocol Environmental Solutions, Inc., Coquitlam (CA)

(72) Inventor: Sergio Vitomir, New Westminster (CA)

(73) Assignee: PROTOCOL ENVIRONMENTAL SOLUTIONS, INC., Coquitlam (CA)

( * ) Notice: Subject to any disclaimer, the term of this patent is extended or adjusted under 35 U.S.C. 154(b) by 0 days.

(21) Appl. No.: 17/359,312

(22) Filed: Jun. 25, 2021

(65) Prior Publication Data

US 2022/0010100 A1    Jan. 13, 2022

Related U.S. Application Data

(60) Provisional application No. 63/050,578, filed on Jul. 10, 2020.

(51) Int. Cl.
    *C08K 13/02*    (2006.01)
    *B08B 7/00*     (2006.01)
    *B08B 3/08*     (2006.01)

(52) U.S. Cl.
    CPC ............. *C08K 13/02* (2013.01); *B08B 3/08* (2013.01); *B08B 7/0014* (2013.01); *B08B 2220/01* (2013.01)

(58) Field of Classification Search
    None
    See application file for complete search history.

(56) References Cited

U.S. PATENT DOCUMENTS

| | | |
|---|---|---|
| 8,585,829 B2 | 11/2013 | Li et al. |
| 8,828,917 B2 | 9/2014 | Rieth et al. |
| 9,003,591 B2 | 4/2015 | Sakashita et al. |
| 2008/0096785 A1 | 4/2008 | Egbe et al. |
| 2009/0281012 A1 | 11/2009 | Trivedi et al. |

FOREIGN PATENT DOCUMENTS

CA    2803389 C    10/2016

*Primary Examiner* — Eric W Golightly
(74) *Attorney, Agent, or Firm* — Umberg Zipser LLP

(57) ABSTRACT

A composition for removal of adhesives comprises a polar solvent, such as benzyl alcohol, in combination with thickeners, dry lubricants, and/or gelling agents to allow for penetration of the adhesive and transformation of the treated adhesive into a solid material that can be readily removed from a surface without forming sticky residue that adheres to the solid material or tool used to remove the adhesive.

20 Claims, No Drawings

COMPOSITIONS AND METHODS FOR REMOVAL OF PRESSURE SENSITIVE ADHESIVES

This application claims the benefit of U.S. Provisional Application No. 63/050,578, filed Jul. 10, 2020, the disclosure of which is hereby incorporated by reference in its entirety.

FIELD OF THE INVENTION

The field of the invention is compositions and methods for removal of pressure sensitive adhesives, especially as it relates to dry removal of adhesives used in flooring.

BACKGROUND OF THE INVENTION

The background description includes information that may be useful in understanding the present invention. It is not an admission that any of the information provided herein is prior art or relevant to the presently claimed invention, or that any publication specifically or implicitly referenced is prior art.

All publications and patent applications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

In the flooring industry in the recent years, adhesives such as mastic have been replaced with pressure sensitive adhesives (PSA). When various flooring such as hard flooring, soft flooring and flexible flooring needs to be replaced, one of the most labor consuming and costly requirements is to effectively remove the PSA from the underlying substrate (concrete, wood, etc).

Various products have been made available to assist in the removal of PSAs. These products can be water-based or pure solvent-type mixtures. The water-based products usually are comprised of a water-miscible solvent such as glycol-ethers as well as surface-active agents. The efficacy of such products is very weak, at best, and typically requires several applications until most of the PSA residue is removed. The time spent when using such products is undesirably high and therefore makes this a less desirable option to contractors.

On the other hand, pure solvent-type products for PSA removal are also becoming less and less acceptable for contractors due to the fact that such products soften the PSA and render the PSA even more sticky than prior to use of such removal products. Additionally, these products can be flammable and/or have an undesirable odor, which, on indoor flooring projects, become undesirable for use. Another drawback of the pure-solvent based products is the high level of regulated VOC's.

Other solvent-based products have been introduced including a variety of additives, such as abrasive particles and ketal adducts (see U.S. Pat. No. 8,828,917). However, these products are designed as general-purpose strippers and, like pure solvent-type products, render the PSA even more sticky than prior to use of such removal products.

Thus, even though various systems and methods of removing adhesives from various surfaces are known in the art, all or almost all of them suffer from several disadvantages. Therefore, there remains a need for compositions and methods for improved compositions and methods that allow for removal of an adhesive in s simple and effective manner.

SUMMARY OF THE INVENTION

The inventive subject matter is directed to various compositions and methods of removing adhesives, and especially pressure sensitive adhesives (PSA) from surfaces where the composition is applied as a liquid dispersion with a swelling agent that penetrates the PSA, and that is subsequently removed as a dry non-tacky material.

In one aspect of the inventive subject matter, the inventors contemplate a composition for removal of the adhesive. The composition includes a liquid phase including an organic solvent. The composition further includes a solid phase dispersed in the liquid phase with the solid phase comprising a thickener, a dry lubricant, and a gelling agent. The composition optionally further includes a surface-active agent.

In some embodiments, the organic solvent is an alcohol comprising an aromatic ring and may, for example, be a benzyl alcohol and a terpinol-type alcohol, toluene, 1-phenyl-1,2-diol. In further embodiments, the thickener is MgO, wherein the dry lubricant is talc, and/or wherein the gelling agent is an organoclay.

For example, the liquid phase may be present in an amount of 35-45%, the thickener may be present in an amount of 40-50%, the dry lubricant may be present in an amount of 3-10%, the gelling agent may be present in an amount of 1-3%, and/or the surface-active agent may be present in an amount of 2-4%. Thus, exemplary compositions may include those comprising benzyl alcohol in an amount of 40-48%, a linear alkylbenzene sulfonic acid in an amount of 2-4%, an organoclay in an amount of 1-2%, magnesium oxide in an amount of 40-50%, and talc in an amount of 3-6%.

Viewed from a different perspective, the inventor also contemplates a method of removing an adhesive from a surface that includes a step of applying a composition as presented herein to an adhesive on a surface, a step of allowing the composition to form a dry treated adhesive, and a step of removing the dry treated adhesive from the surface.

Where desired, the adhesive and/or surface may be pretreated, and/or the step of applying comprises brushing the composition onto the surface. Typically, drying is performed for at least 2 hours. Thereafter, the step of removing will typically comprise breaking the dry treated adhesive into particles, and it is contemplated that the surface may be washed after the step of removing.

Likewise, the inventors also contemplate a method of restoring the surface. The surface includes a first flooring (i.e., old flooring) coupled to the surface by the adhesive. The method includes separating the first flooring from the surface with at least a portion of the adhesive remains coupled to the surface. The method further includes applying the composition to the adhesive coupled to the surface to form a dry treated adhesive. The method includes removing the dry treated adhesive from the surface to form a restored surface. In various embodiments, the method includes the step of allowing the composition to contact the adhesive for a period of at least 2 hours to form the dry treated adhesive. In these and other embodiments, the method includes the step of applying a second flooring (i.e., new flooring) to the restored surface after removing the dry treated adhesive.

Consequently, the inventor also contemplates a method of forming a dry non-tacky material from an adhesive treated with an organic solvent composition that includes a step of including into the solvent composition a thickener, a dry lubricant, and a gelling agent. Most typically, the thickener is present in the solvent composition an amount of 40-50%, the dry lubricant is present in the solvent composition in an amount of 3-10%, and the gelling agent is present in the solvent composition in an amount of 1-3%.

While not limiting the inventive subject matter it is generally preferred that the organic solvent is an alcohol comprising an aromatic ring, and/or that the thickener is MgO, the dry lubricant is talc, and/or that the gelling agent is an organoclay.

Various objects, features, aspects and advantages of the inventive subject matter will become more apparent from the following detailed description of preferred embodiments.

DETAILED DESCRIPTION

The inventor has now discovered various compositions and methods of removing adhesives, and especially pressure sensitive adhesives (PSA) from solid surfaces that address the main concerns otherwise encountered when removing such adhesives as follows.

Advantageously, the compositions presented herein render the PSA non-sticky, but soft and easy to scrape off. Moreover, PSA can be substantially completely removed after only a single application of the compositions presented here. Furthermore, the inventive composition is non-flammable, generates no TAPS and/or HAPS (Toxic and/or Hazardous Air Pollutants) and does not release non-regulated VOCs or has unpleasant odor. Beneficially, so generated PSA waste can be easily and simply removed and disposed. PSAs typically comprise an elastomer component (e.g., acrylates, styrene block copolymers, ethylene-vinyl acetate, rubbers, etc.) and a tackifier where adhesiveness of the elastomer component is insufficient. Suitable tackifiers typically include rosin esters and/or silicate resins (e.g., made from a monofunctional trimethyl silane and a quadrafunctional silicon tetrachloride.

For example, one exemplary composition comprises about 43.86% (+/−10%) benzyl alcohol, about 3.11 (+/−1.5%) linear alcohol ethoxylates (e.g., Stepan S101), 1.55% (+/−0.8%) Bentonite 27, 46.71% (+/−10%) magnesium oxide, and 4.73% (+/−2.2%) talc. Of course, it should be appreciated that the exact percentages may vary depending on the particular needs for the formulation. However, it is generally contemplated that the benzyl alcohol may be present in an amount of at least 10 wt. %, or at least 15 wt. %, or at least 20 wt. %, or at least 25 wt. %, or at least 30 wt. %, or at least 35 wt. %, or at least 40 wt. %, or at least 45 wt. %, or at least 50 wt. %, or at least 55 wt. %, or at least 60 wt. %, or at least 65 wt. %, over even more. Thus, and viewed from a different perspective, the benzyl alcohol may be present in quantities of from about 10 to about 20 wt. %, from about 20 to about 30 wt. %, from about 30 to about 40 wt. %, from about 40 to about 50 wt. %, from about 50 to about 60 wt. %, or even more, based on a total weight of the composition.

While linear alcohol ethoxylates are typically present in an amount of from about 2 to about 4 wt. %, the linear alcohol ethoxylates may also be present in quantities of from about 0.1 to about 0.5 wt. %, from about 0.7 to about 1.2 wt. %, from about 1 to about 1.5 wt. %, from about 1.2 to about 2.0 wt. %, from about 1.5 to about 2.5 wt. %, from about 2.5 to about 4 wt. %, from about 3.5 to about 5 wt. %, from about 4.5 to about 6 wt. %, or from about 5.0 to about 8 wt. %, based on a total weight of the composition. Thus, linear alcohol ethoxylates may be present in an amount of at least 0.1 wt. %, or at least 0.5 wt. %, or at least 1.0 wt. %, or at least 1.5 wt. %, or at least 2.0 wt. %, or at least 3.0 wt. %, or at least 4.0 wt. %, or at least 5.0 wt. %, or at least 6.5 wt. %, or even more, based on a total weight of the composition.

With respect to bentonite it is contemplated that bentonite may be present in an amount of at least 0.1 wt. %, or at least 0.3 wt. %, or at least 0.5 wt. %, or at least 0.8 wt. %, or at least 1.0 wt. %, or at least 1.3 wt. %, or at least 1.6 wt. %, or at least 1.9 wt. %, or at least 2.5 wt. %, or at least 3.0 wt. %, or even more, based on a total weight of the composition. Thus, bentonite may be present in quantities of from about 0.1 to about 0.5 wt. %, from about 0.5 to about 1.0 wt. %, from about 1.0 to about 1.5 wt. %, from about 1.5 to about 2.0 wt. %, from about 2.0 to about aa3.0 wt. %, or even more, based on a total weight of the composition.

Likewise, the amount of magnesium oxide may vary considerably, and suitable amounts include at least 10%, or at least 15%, or at least 20%, or at least 25%, or at least 30%, or at least 35%, or at least 40%, or at least 45%, or at least 50%, or at least 55%, or at least 60%, or at least 65%, over even more. Thus, and viewed from a different perspective, the magnesium oxide may be present in quantities of from about 10 to about 20 wt. %, from about 20 to about 30 wt. %, from about 30 to about 40 wt. %, from about 40 to about 50 wt. %, from about 50 to about 60 wt. %, or even more, based on a total weight of the composition.

Talc may be present in an amount of at least 0.3%, or at least 0.8%, or at least 1.5%, or at least 2.5%, or at least 3.5%, or at least 4.5%, or at least 5.5%, or at least 6.5%, or at least 8.0%, or even more. Thus, the talc may be present in quantities of from about 0.3 to about 1.0%, from about 1.0 to about 2.5%, or from about 2.5 to about 4.5%, from about 3.5 to about 6.0%, from about 4.0 to about 7.0%, or even more, based on a total weight of the composition.

With regard to the benzyl alcohol it should be appreciated that benzyl alcohol may be replaced at least in part by other slow evaporating organic solvents that can act as a swelling agent for the adhesive. Thus, suitable slow evaporating solvents include benzyl alcohol and a terpinol-type alcohols (such as d-limonene), toluene, 1-phenyl-1,2-diol, etc. individually or in any reasonable combination thereof. Thus, in certain embodiments, benzyl alcohol is utilized but is not the exclusive solvent that can be used in the composition of this invention. Typically, the concentration of the alcohols individually or in admixture is from about 20% to about 60% (w/w), from about 35% to about 45% (w/w) or from about 39% to about 45% (w/w).

Contemplated compositions may also include one or more thickeners that provide various advantages and/or functions, individually or in combination. For example, suitable thickeners include magnesium oxide, aluminum oxide (calcinated alumina), barium sulphate, magnesium hydroxide, pumice, nepheline syenite, fumed silica, inorganic clays, etc. Notably, among all thickeners tested, the best performance was achieved when using magnesium oxide. While not limiting the inventive subject matter, the inventor contemplates that exemplary fillers are able to wet the alcohol of choice, absorb and retain the solvent, and release the solvent when the product is applied on top of PSA, as well as create a slurry that makes the finished product easy to apply and distribute easily on large areas. Most typically, the concentration of magnesium oxide or other suitable thickeners will be in a range of from about 30% to about 60% (w/w), from about 45% to about 50% (w/w), or from about 40% to about 49% (w/w).

In further contemplated aspects, contemplated compositions will also include a dry lubricant such as talc. The inventor has discovered that the dry lubricant (e.g., talc) greatly facilitated the removal of reacted PSA by allowing easy scraping and preventing adhesion of the removed PSA to metal scrapers or other removal tools. This is a significant advantage over other products as cleaning of tools between scraping requires substantial time commitment and effort, and so directly influences the viability of the product. Most typically, dry lubricants will have a concentration range from about 1 to about 15 wt. %, from about 3 to about 10 wt. %, or from about 4 to about 5 wt. %.

Contemplated composition will preferably also include a specific surface-active agent that exhibits very low or no foaming, that is in liquid form, and is substantially water free (e.g., equal or less than 1%, or equal or less than 0.1% water). In this context it should be noted that the surface-active agent is not involved in the process of the removal of the PSA. Rather its main function is to activate after the removal of the PSA and rinsing of the floor with water to ensure that very little or no residue stays on the substrate. It has been found that the best surface-active agent for this invention is a linear alkylbenzene sulfonic acid (e.g., commercially available as Stepan S101 or similar). For example, suitable concentrations of this surfactant in the present composition are from about 0.5 to about 5%\, from about 2 to about 4 wt. %, or about 3.0% (w/w).

In still further contemplated aspects, many compositions also include one or more gelling agents (also referred to as dispersing and/or anti-syneresis agents) to prevent or reduce solvent/solids separation as well as the formation of a solid precipitate that would lead to reduction of the shelf-life of the product. For example, suitable materials of choice include clays and modified claims such as Bentone 27 (commercially available from Elementis; modified organoclay produced by reacting an amine with natural hectorite clay).

The composition may include additional components to aid in the function or form of the composition. Non-limiting examples of additional components include abrasive particles, organic amine accelerators, organic acid accelerators, antioxidants, antirust additives, biocides, colorants, corrosion inhibitors, cosolvents, defoamers, dyes, enzymes, light stabilizers, odor masking agents (including perfumes), plasticizers, preservatives, additional surfactants (including amphoteric, anionic, cationic, nonionic, or zwitterionic), rheology modifiers, and combinations thereof. It is to be understood that any single component described herein can have more than one function, and that characterization of a component as having that function (e.g., as a thickener) does not exclude the additive from performing another function. The concentrations of the individual additives of the compositions can be varied as depending upon components of the composition, the type of adhesive to be applied to, and the rate at which adhesive removal or de-tackifying is to be effected. Effective concentrations for a particular application can be readily determined by those skilled in the art.

The accelerators are believed to accentuate the performance of the composition by chemically attacking the organic binder of the adhesive and thereby weakening the adhesion and cohesion of the adhesive. Exemplary amine accelerators include ethanolamine, diethanolamine, ethylenediamine tetraacetic acid, morpholine, triethanolamine, triethylamine, and 2-(N,N'-diethylamino)ethanol). Exemplary organic acid accelerators include $C_{1-22}$ carboxylic acids (e.g., formic acid, acetic acid, propionic acid, oleic acid, oxalic acid, and hydroxyacetic acid). When used as an additive, the amine accelerator can be present in an amount from 0.1 to 20 wt. %, or from 1 to 10 wt. %, based on a total weight of the composition, although other amounts outside these ranges are contemplated.

Corrosion inhibitors can be present, particularly where the composition is provided in a metal container, or when an acid accelerator is present. Exemplary corrosion inhibitors include a molecule that has both an oil soluble portion and a water soluble portion, such as an amphoteric surfactant containing an amine functionality in an amount from about 0.05% to about 2% by weight, specifically about 0.25% to about 1.0%, such as the disodium N-lauryl iminodipropionate esters, amine soaps of fatty acids and fatty alkanolamides such as $C_8$ to $C_{18}$ fatty alkanolamides.

Exemplary odor masking agents include essential oils, aroma chemicals, perfumes, and the like, for example, ambergris, borneol and its esters, carvone, castoreum, civet, cinnamaldehyde, citrals, clove oil, galbanum, jasmine, limonene, linalool and its esters, pinenes (alphas, betas, etc.), rosemary oil, sandalwood, terpineols, terpinenes, and the like, benzaldehyde, benzoin, isoamyl acetate (banana); isobutyl propionate (rum); methyl anthranilate (grape); benzyl acetate (peach), dipentene, methyl butyrate (apple); ethyl butyrate (pineapple); octyl acetate (orange); n-propyl acetate (pear); ethyl phenyl acetate (honey), and the like. An effective amount of such odor masking agents will be readily determinable by those skilled in the art, and can be present in an amount of from about 0.25 to about 2.50 wt. % or from about 0.4 to about 1.0 wt. %, based on a total weight of the composition, although other amounts outside these ranges are contemplated.

Exemplary plasticizers include phthalate esters, for example dibutyl phthalate, diethylhexyl phthalate, and diethyl phthalate, aliphatic diesters, for example dioctyl adipate, terephthalate esters, for example dioctyl terephthalate, citrate esters, for example acetyl triethyl citrate and acetyl tri-n-butyl citrate, and ketal based plasticizers. When used, the plasticizer is present in an amount from about 0.1 to about 10 wt. %, based on the total weight of the composition, although other amounts outside these ranges are contemplated.

A wide variety of surfactants can be utilized in addition to or alternatively to the surface-active agent, depending on the application, and can be amphoteric, anionic, cationic, nonionic, or zwitterionic. A surfactant or combination of surfactants can be present in order to improve wetting of the coating to be removed and to hasten penetration of the active components. In addition, a surfactant can facilitate water rinsing and water clean-up of the substrate after removal of the coating. Exemplary amphoteric surfactants include amine oxide compounds having the formula RR'R"N—O wherein each R, R' and R" is independently a $C_1$-$C_{24}$ alkyl, aryl or arylalkyl group) that can optionally contain one or more P, O, S or N heteroatoms. Exemplary amphoteric surfactants also include betaine compounds of the formula RR'R"N+$(CH_2)_n$C(O)O— wherein each R, R' and R" is independently a $C_1$-$C_{24}$ alkyl, aryl or arylalkyl group) that can optionally contain one or more P, O, S or N heteroatoms and n is about 1 to about 10. The surfactant can be present in an amount of from about 0.1 to about 20 wt. %, from about 0.1 to about 15 wt. %, or from about 2 to about 15 wt. %, based on a total weight of the composition, although other amounts outside these ranges are contemplated.

Exemplary anionic surfactants include the water-soluble salts of alkylbenzene sulfonates such as the isopropylamine salt of a $C_{10-14}$ alkyl benzene sulfonic acid, and/or a $C_{8-14}$ fatty alcohol sulfate, alkyl sulfates, alkyl polyethoxy ether sulfates, paraffin sulfonates, alpha-olefin sulfonates and sulfosuccinates, alpha-sulfocarboxylates and their esters, alkyl glyceryl ether sulfonates, fatty acid monoglyceride sulfates and sulfonates, alkyl phenol polyethoxyether sulfates, the water-soluble salts or esters of alpha-sulfonated fatty acids containing from about 6 to about 20 carbon atoms in the fatty acid group and from about 1 to about 10 carbon atoms in the ester group, and the like. When present, the anionic surfactant can be present in the composition in an amount from about 0.1 to about 15 wt. %, from about 3 to about 12 wt. %, or from about 5 to about 10 wt. %, based on a total weight of the composition, although other amounts outside these ranges are contemplated.

In addition to, or alternatively to an anionic surfactant, a short-chain surfactant can be present, for example $C_3$-$C_6$ alcohols, glycols, glycol ethers such as propylene glycol n-butyl ether, pyrrolidones, glycol ether esters, and the like.

Exemplary cationic surfactants include quaternary amine compounds having the formula RR'R"R'"N+X where each R, R', R" and R'" is independently a $C_1$-$C_{24}$ alkyl, aryl or arylalkyl group) that can optionally contain one or more P, O, S or N heteroatoms, and X is F, Cl, Br, I or an alkyl sulfate.

Exemplary nonionic surfactants include alcohol ethoxylates (e.g., $C_6$-$C_{24}$ or $C_6$-$C_{16}$ alcohol ethoxylates) having 1 to about 20 ethylene oxide groups (e.g., about 9 to about 20 ethylene oxide groups), alkylphenol ethoxylates (e.g., $C_6$-$C_{24}$ or $C_8$-$C_{10}$ alkylphenol ethoxylates) having 1 to about 100 ethylene oxide groups (e.g., about 12 to about 20 ethylene oxide groups), alkylpolyglycosides (e.g., $C_6$-$C_{24}$ or $C_6$-$C_{20}$ alkylpolyglycosides) having 1 to about 20 glycoside groups (e.g., about 9 to about 20 glycoside groups). A combination comprising at least one of the foregoing can be used.

Rheology modifiers, which may be utilized as the thickener or the gelling agent in addition to or alternatively to the thickeners or the gelling agents described above, can be present to adjust the rheological properties of the composition. Rheology modifiers can also serve to increase the effectiveness of the composition by decreasing the rate of evaporation of the volatile components after application to the adhesive. Exemplary rheology modifiers include natural or synthetic clays including bentonite, hectorite, smectite and other silicates; stearates of organoclay compounds such as tetraalkyl ammonium bentonite; gums and other polysaccharides such as carrageenan gum, cassia gum, diutan gum, gellan gum, guar gum, Gum Arabic, Gum Tragacanth, locust bean gum, whelan gum and Xanthan gum; hydrocolloids; alginates such as agar; cellulose ethers such as ethyl cellulose, hydroxyethyl cellulose, ethyl hydroxyethyl cellulose, methyl cellulose, hydroxypropyl cellulose, hydroxypropyl methyl cellulose, and other alkyl or hydroxyalkyl cellulose ethers; acrylic acid homopolymers or copolymers, e.g., those which may be neutralized with a salt including associative or non-associative thickenersor those which may be cross-linked; polyethylene oxides (e.g., high molecular weight polyethylene oxides) such as polyethylene glycols and methoxypolyethylene glycols; polyvinyl alcohols; polyvinyl pyrrolidone; starches; polyurethanes; methyl vinyl ether/maleic anhydride copolymers; hydrophobe-modified ethoxy urethane (HEUR) thickeners; hydrophobe-modified alkali soluble emulsion (HASE) thickeners; hydrophobe-modified hydroxyethyl cellulose (HM-HEC) thickeners; and HEUR-ASE combination thickeners.

In most typical uses, it should therefore be appreciated that the compositions presented herein are suspensions/dispersions that can be readily applied to a surface on which the PSA is disposed. As will be readily appreciated, suitable surfaces include architectural surfaces such as floors, walls, etc., surfaces on mobile objects (e.g., deck of a marine vessel), and other surfaces upon which previously a PSA has been applied. Thus, suitable surfaces include cement, concrete, terrazzo, various metals, wood, etc. Application can be performed in various manners, including brushing, spraying, pouring, etc. In general, the compositions presented herein will be applied in an amount sufficient to contact PSA and to allow the alcoholic solvent in the PSA to penetrate and swell the PSA. Thus, suitable quantities applied will be in the range of 1-3 $g/m^2$, or 3-5 $g/m^2$, or 5-10 $g/m^2$, or 10-15 $g/m^2$, or 15-25 $g/m^2$, or even more. Most typically, and viewed from a different perspective, suitable quantities will be such that the PSA is completely covered by the composition but that there is no significant residual liquid after several hours of application.

Depending on the thickness of the PSA and amount of the composition applied, it is generally contemplated that the composition will be allowed to penetrate and swell the PSA and that the composition will remain on the PSA for a time sufficient to form a dry layer. In various embodiments, the PSA has a thickness in an amount of at least 1 millimeter (mm), at least 2 mm, at least 3 mm, or even more. Thus, it is contemplated that the composition will remain on the PSA after application for a predetermined amount of time or for a period of at least 10 minutes, or at least 20 minutes, or at least 30 minutes, or at least 60 minutes, or at least 120 minutes, or at least 240 minutes, even longer. Viewed from different perspective, it is generally preferred that the composition remains on the PSA until the composition has a dry appearance and feels dry to the touch.

In further aspects of the inventive subject matter, it is contemplated that the PSA and the surface upon which the PSA is disposed may be chemically and/or mechanically pre-treated to facilitate enhanced contact of the composition with the PSA, especially where the PSA layer is relatively think. Among other pretreatments, the surface may be pre-treated with one or more solvents to soften the PSA, and/or may be mechanically disrupted (e.g., using a scraper, sander, grit blaster, etc.) to render the surface of the PSA more accessible.

Thus, it should be appreciated that the composition presented herein will not only provide a solvent (typically alcoholic solvent) that swells and at least partially dissolves the PSA, but also includes additional components dispersed therein that perform specific functions that allow removal of the treated PSA as a dry and crust-like material without significant leftovers on the surface and tool used to remove the treated PSA. For example, contemplated compositions will include (typically in suspension) a thickening agent that accelerates evaporation, a dry lubricant that facilitates disintegration of the dried material into smaller pieces that can be easily removed, and a gelling agent to prevent or reduce agglomeration of the solids in the dispersion. While water may be present in the composition, it is generally preferred that the composition is substantially water-free. In still further embodiments, one or more moisture sensitive colorants may be included that will change color to indicate the state of drying.

Upon application and drying, the so treated PSA can then be removed from the surface as a solid, dry, and crumbly, flakey, or powdery material that will not stick to the surface and/or tool with which the treated PSA is being removed. Advantageously, the treated PSA can be disposed of in a landfill or other location without concern for adverse environmental consequences due to solvent toxicity, outgassing of noxious vapors, etc.

Examples

The following examples are provided to illustrate certain aspects of the compositions presented herein and are not intended to limit the scope of the invention. Unless otherwise indicated a preferred composition has the following ingredients that were intimately mixed to form a homogenous dispersion: Benzyl Alcohol (43.86%), Stepan 5101 (3.11%), Bentonite 27 (1.55%), Magnesium Oxide (46.71%), and Talc (4.73%).

A section of concrete floor 5×5 meters where a PSA glue has been troweled and let cure for 2 weeks was divided in smaller sections and various formulations of the glue remover composition were applied in a thin layer. The glue removal efficacy was tested after drying for 2 hours for each section and each formula. The testing was performed by manual scraping of the test area using an industry specific scraper (blade scraper). While scraping was performed the following factors where observed: (1) Ease of glue detachment from concrete; (2) Degree of stickiness of the collected glue on the scraper blade; (3) Visual evaluation of glue residue left after scraping; (4) Degree of stickiness of residue left on the concrete when touching by hand; and (5) Ease of residue removal by washing and scrubbing with cold water. The above factors were rated together and recorded as Poor, Good and Very Good. The tested formulations differed in composition of various ingredients and concentration of some of the ingredients involved.

Among other solvents tested, benzyl alcohol was practically preferred. Many other solvents had been considered and/or tested and were eliminated due to either poor performance, toxicity, flammability, excessive odor, etc. In addition to the solvent phase, the glue remover may also comprise other ingredients such as thickeners, surfactants, activators, fillers, dispersants, anti-settling agents etc. Some of the most relevant formulations that become decisive in to finding the optimum composition are listed in the table below:

| Ingredient | A (w/w) | B (w/w) | C (w/w) | D (w/w) | E (w/w) | F (w/w) | G (w/w) |
|---|---|---|---|---|---|---|---|
| Benzyl Alcohol | 43.86 | 40.90 | 32.91 | 43.86 | 36.4 | 36.4 | 43.86 |
| Ethyl Alcohol | 0 | 0 | 3.71 | 0 | 0 | 0 | 0 |
| D-Limonene | 0 | 0 | 0 | 0 | 10.46 | 0 | 0 |
| Butyl Alcohol | 0 | 0 | 0 | 0 | 0 | 10.46 | 0 |
| TEA | 0 | 0.62 | 0.55 | 0 | 0 | 0 | 0 |
| SMO-5 | 0 | 0.62 | 0 | 0 | 0 | 0 | 0 |
| Klucel | 0 | 0 | 0.37 | 0 | 0 | 0 | 0 |
| Nefeline | 0 | 0 | 62.43 | 0 | 0 | 0 | 0 |
| Magnesium Oxide | 46.71 | 57.85 | 0 | 0 | 47.58 | 47.58 | 0 |
| Talc | 4.73 | 0 | 0 | 4.73 | 5.55 | 5.55 | 4.73 |
| Barium Sulfate | 0 | 0 | 0 | 0 | 0 | 0 | 46.71 |
| Aluminum Oxide | 0 | 0 | 0 | 0 | 0 | 0 | 0 |
| Pumice | 0 | 0 | 0 | 46.71 | 0 | 0 | 0 |
| Bentonite- 27 | 1.55 | 0 | 0 | 0 | 0 | 0 | 1.55 |
| S-101 | 3.11 | 0 | 0 | 0 | 0 | 0 | 3.11 |

Description of Ingredients: Benzyl Alcohol: Technical Grade; Ethyl Alcohol: Denatured; D-Limonene: Technical grade; TEA: Triethanol Amine 85%; SMO-5: Lonza Sorbitan Oleate; Klucel: Hydroxy Propyl Cellulose; Nefeline: Nepheline Syenite; Magnesium Oxide: Technical grade; Talc: Paint grade; Barium Sulphate: Barite; Aluminum Oxide: Calcinated; Pumice: Fine grade; Bentonite 27: Elementis Organoclay; S-101: Stepan alcohol ethoxylate.

| FORMULATION | EASE OF SCRAPING | DEGREE OF STICKENESS | RESIDUE REMOVAL/COLD WATER | OVERALL |
|---|---|---|---|---|
| A | Very good | Low | Very good | Very Good |
| B | Poor | High | Poor | Poor |
| C | Poor | High | Poor | Poor |
| D | Good | Low | Poor | Good |
| E | Very good | Low | Poor | Good |
| F | Poor | Low | Poor | Poor |
| G | Very good | Low | Poor | Good |

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. For example, the term "about" when used in a conjunction with a numerical value denotes a range for that numerical value +/−10%, inclusive. The recitation of ranges of values herein is merely intended to serve as a shorthand method of referring individually to each separate value falling within the range. Unless otherwise indicated herein, each individual value is incorporated into the specification as if it were individually recited herein. Unless stated otherwise, all % values are weight percent values (w/w).

All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise. As also used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification or claims refer to at least one of something selected from the group consisting of A, B, C . . . and N, the text should be interpreted as requiring only one element from the group, not A plus N, or B plus N, etc.

What is claimed is:

1. A composition for removal of an adhesive, comprising:
a liquid phase comprising an organic solvent; and
a solid phase dispersed in the liquid phase, the solid phase comprising a thickener, a dry lubricant, and a gelling agent.

2. The composition of claim 1, wherein the adhesive is a pressure sensitive adhesive.

3. The composition of claim 1, wherein the organic solvent is an alcohol comprising an aromatic ring.

4. The composition of claim 1, wherein the organic solvent is selected from the group consisting of a benzyl alcohol and a terpinol-type alcohol, toluene, 1-phenyl-1,2-diol.

5. The composition of claim 1, wherein the thickener is MgO, wherein the dry lubricant is talc, and/or wherein the gelling agent is an organoclay.

6. The composition of claim 1, wherein, each based on a total weight of the composition:
   (a) the liquid phase is present in an amount of from about 35 wt. % to about 45 wt. %;
   (b) the thickener is present in an amount of from about 40 wt. % to about 50 wt. %;
   (c) the dry lubricant is present in an amount of from about 3 wt. % to about 10 wt. %;
   (d) the gelling agent is present in an amount of from about 1 wt. % to about 3 wt. %;
   (e) a surface-active agent is present in an amount of from about 2 wt. % to about 4 wt. %; or
   (f) any combination of (a) to (e).

7. The composition of claim 1, wherein the organic solvent comprises benzyl alcohol and is present in an amount of from about 40 wt. % to about 48 wt. %, the composition further comprises a surface-active agent wherein the surface-active agent comprises a linear alkylbenzene sulfonic acid and is present in an amount of from about 2 wt. % to about 4 wt. %, the gelling agent comprises an organoclay and is present in an amount of from about 1 wt. % to about 2 wt. %, the thickener comprises magnesium oxide and is present in an amount of from about 40 wt. % to about 50 wt. %, and the dry lubricant comprises talc and is present in an amount of from about 3 wt. % to about 6 wt. %, each based on a total weight of the composition.

8. A method of removing an adhesive from a surface, the method comprising:
applying a composition of claim 1 to an adhesive on a surface;
allowing the composition to contact the adhesive for a predetermined period to form a dry treated adhesive; and
removing the dry treated adhesive from the surface.

9. The method of claim 8 further comprising a step of pretreating the adhesive and/or surface.

10. The method of claim 8, wherein the step of applying comprises brushing the composition onto the surface.

11. The method of claim 8, wherein the drying is performed for a time period of at least 2 hours.

12. The method of claim 8, wherein the step of removing comprises breaking the dry treated adhesive into particles.

13. The method of claim 8 further comprising a step of washing the surface after the step of removing.

14. A method of restoring a surface comprising a first flooring coupled to the surface by an adhesive, the method comprising:
separating the first flooring from the surface, wherein at least a portion of the adhesive remains coupled to the surface;
applying the composition of claim 1 to the adhesive coupled to the surface to form a dry treated adhesive; and
removing the dry treated adhesive from the surface to form a restored surface.

15. The method of claim 14 further comprising the step of allowing the composition to contact the adhesive for a period of at least 2 hours to form the dry treated adhesive.

16. The method of claim 14 further comprising the step of applying a second flooring to the restored surface after removing the dry treated adhesive.

17. The method of claim 14, wherein the adhesive has a thickness in an amount of at least 1 millimeter.

18. A method of forming a dry non-tacky material from an adhesive treated with an organic solvent composition, the method comprising:

combining an organic solvent, a thickener, a dry lubricant, and a gelling agent to form the organic solvent composition; wherein a liquid phase of the organic solvent composition comprises the organic solvent, and a solid phase dispersed in the liquid phase comprises the thickener, the dry lubricant and the gelling agent;

applying the organic solvent composition to the adhesive to form the dry non-tacky material;

wherein the thickener is present in the organic solvent composition an amount of from about 40 wt. % to about 50 wt. %, wherein the dry lubricant is present in the organic solvent composition in an amount of from about 3 wt. % to about 10 wt. %, and wherein the gelling agent is present in the organic solvent composition in an amount of from about 1 wt. % to about 3 wt. %, each based on a total weight of the composition.

19. The method of claim 18, wherein the organic solvent comprises an alcohol comprising an aromatic ring.

20. The method of claim 18, wherein the thickener comprises MgO, wherein the dry lubricant comprises talc, and/or wherein the gelling agent comprises an organoclay.

* * * * *